US010608882B2

(12) United States Patent
Chen et al.

(10) Patent No.: US 10,608,882 B2
(45) Date of Patent: Mar. 31, 2020

(54) TOKEN-BASED LIGHTWEIGHT APPROACH TO MANAGE THE ACTIVE-PASSIVE SYSTEM TOPOLOGY IN A DISTRIBUTED COMPUTING ENVIRONMENT

(71) Applicant: International Business Machines Corporation, Armonk, NY (US)

(72) Inventors: Paul Chen, Markham (CA); Philip Kurowski, Markham (CA); Alex Luo, Markham (CA)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 15/434,263

(22) Filed: Feb. 16, 2017

(65) Prior Publication Data

US 2018/0234304 A1  Aug. 16, 2018

(51) Int. Cl.
| | |
|---|---|
| *G06F 15/16* | (2006.01) |
| *H04L 12/24* | (2006.01) |
| *H04L 29/08* | (2006.01) |
| *H04L 29/14* | (2006.01) |
| *G06F 15/173* | (2006.01) |

(52) U.S. Cl.
CPC .......... *H04L 41/0893* (2013.01); *H04L 41/12* (2013.01); *H04L 67/10* (2013.01); *H04L 69/40* (2013.01)

(58) Field of Classification Search
CPC ............................ H04L 41/0893; H04L 67/10
USPC ......................................................... 709/217
See application file for complete search history.

(56) References Cited

U.S. PATENT DOCUMENTS

| | | | |
|---|---|---|---|
| 7,421,478 B1 | 9/2008 | Muchow | |
| 8,051,491 B1* | 11/2011 | Cavage | G06F 21/6218 726/30 |
| 8,433,760 B2 | 4/2013 | Ganapathy et al. | |
| 8,590,025 B2 | 11/2013 | Bharadwaj | |
| 8,699,322 B1 | 4/2014 | Tawri et al. | |
| 9,723,063 B2 | 8/2017 | Reza | |
| 2003/0028653 A1* | 2/2003 | New, Jr. | H04L 63/04 709/229 |
| 2008/0028436 A1* | 1/2008 | Hannel | H04L 63/0218 726/1 |

(Continued)

OTHER PUBLICATIONS

"ZooKeeper", The Apache Software Foundation; 2013.

*Primary Examiner* — Karen C Tang
(74) *Attorney, Agent, or Firm* — Brown & Michaels, PC; Nicholas Bowman

(57) ABSTRACT

A method of managing an active-passive topology in a distributed computing environment comprising a plurality of systems each having a token manager connected to a common resource accessible by all of the systems comprising a token pool of tokens. The token manager locks the token pool and checks the token pool for an available token. When a token is available, the token manager leases the available token and unlocks the token pool. The token manager designates the system as an active system and alters an owner of the token to the active system. The token manager of the active system updates a leasing time of the token leased during use of the token by the active system and in response to an active system deactivation or stoppage, the token manager locks the token pool to return the token to the token pool and unlocking the token pool.

20 Claims, 4 Drawing Sheets

(56) References Cited

U.S. PATENT DOCUMENTS

| | | | |
|---|---|---|---|
| 2010/0094806 A1* | 4/2010 | Apostolides | G06F 12/0815 707/637 |
| 2010/0229218 A1* | 9/2010 | Kumbalimutt | G06F 9/5005 726/4 |
| 2012/0303737 A1* | 11/2012 | Kazar | G06F 12/0815 709/213 |
| 2013/0074168 A1* | 3/2013 | Hao | H04L 9/3213 726/7 |
| 2013/0246588 A1* | 9/2013 | Borowicz | G06F 17/30575 709/220 |
| 2013/0339731 A1* | 12/2013 | Rowles | H04L 63/0807 713/168 |
| 2014/0075568 A1* | 3/2014 | Sathyadevan | G06F 21/6218 726/27 |
| 2014/0344153 A1* | 11/2014 | Raj | G06Q 20/3821 705/44 |
| 2015/0032625 A1* | 1/2015 | Dill | G06Q 20/385 705/44 |
| 2015/0142673 A1* | 5/2015 | Nelsen | G06Q 20/385 705/76 |
| 2015/0163206 A1* | 6/2015 | McCarthy | G06F 21/6227 713/171 |
| 2015/0199689 A1* | 7/2015 | Kumnick | G06Q 20/3674 705/67 |
| 2015/0312038 A1* | 10/2015 | Palanisamy | H04L 9/3213 713/155 |
| 2016/0092442 A1* | 3/2016 | Gillett | G06F 17/30011 707/608 |
| 2016/0267738 A1* | 9/2016 | Carstens | A47G 29/141 |
| 2016/0359724 A1* | 12/2016 | Bent | G06F 17/30566 |
| 2016/0373458 A1* | 12/2016 | Moreton | H04L 63/102 |
| 2017/0177253 A1* | 6/2017 | Hayes | G06F 3/0622 |
| 2017/0295155 A1* | 10/2017 | Wong | H04L 63/08 |
| 2017/0316418 A1* | 11/2017 | Sarin | G06Q 20/40145 |
| 2017/0339005 A1 | 11/2017 | Yuan et al. | |
| 2018/0075447 A1* | 3/2018 | Moreton | G06Q 20/327 |
| 2018/0091538 A1* | 3/2018 | Narayanan | H04L 63/06 |
| 2018/0144322 A1* | 5/2018 | Unnerstall | G06Q 20/202 |
| 2018/0314564 A1* | 11/2018 | Chilukuri | G06F 9/5005 |
| 2018/0332472 A1* | 11/2018 | Lu | H04L 29/06 |

* cited by examiner

TOKEN-BASED LIGHTWEIGHT APPROACH TO MANAGE THE ACTIVE-PASSIVE SYSTEM TOPOLOGY IN A DISTRIBUTED COMPUTING ENVIRONMENT

BACKGROUND

The present invention relates to a distributed computing environment, and more specifically to a token-based lightweight approach to manage an active passive topology in a distributed computing environment.

In a distributed computing environment, an active-passive systems topology is a group of systems arranged in such a way that only selected systems are performing the desired tasks while the others are on standby. The performing systems are in active mode while the standby ones are in passive mode. When one active system fails, one passive system can become active and take over the failed system. Active-passive system topology is used to handle an unplanned outage by providing redundancy and high availability. However, effectively managing this active-passive system topology can be challenging. The challenges include: how to select the active system(s); how to detect system failure; and how to trigger the failover action when a system fails.

The traditional approach of managing the active-passive system topology leverages a dedicated system in the topology, usually called high availability (HA) Manager. HA Manager generally selects the active systems using Network Quorum algorithms. The HA Manager relies on a heartbeats protocol to collect the status of all systems in the topology. Heartbeat is a periodic status message broadcasting from one system to the rest of the group to indicate the sending system is alive. When a system fails to receive a heartbeat from a sending system, the sending system is considered down and the HA Manager will trigger a failover action. HA Manager is also required to handle Network Quorum related issues such as Split-brain, which can happen when the network is down but the systems are still running, resulting in a failover action triggered by mistake.

The drawback of this traditional approach is that this is not lightweight. With all the design considerations in place, designing and implementing a centralized, dedicated system (HA Manager) adds complexity to the overall architecture. It also adds overhead to the system deployment and maintenance in the production environment.

SUMMARY

According to one embodiment of the present invention, a method of managing an active-passive topology in a distributed computing environment is disclosed. The distributed computing environment comprising a plurality of systems each having a token manager connected to a common resource accessible by all of the systems comprising a token pool of tokens. The method comprising the steps of: a token manager of a system locking the token pool and checking the token pool for an available token; when a token is available, the token manager leasing the available token and unlocking the token pool; the token manager designating the system as an active system and altering an owner of the token to the active system; the token manager of the active system updating a leasing time of the token leased during use of the token by the active system; and in response to an active system deactivation or stoppage, the token manager locking the token pool to return the token to the token pool and unlocking the token pool.

According to another embodiment of the present invention, a computer program product for managing an active-passive topology in a distributed computing environment is disclosed. The distributed computing environment comprising a plurality of systems each having a token manager connected to a common resource accessible by all of the systems comprising a token pool of tokens. The token manager having a computer comprising at least one processor, one or more memories, one or more computer readable storage media, the computer program product comprising a computer readable storage medium having program instructions embodied therewith. The program instructions executable by the computer of the token manager to perform a method comprising: locking, by the token manager of the system, the token pool and checking the token pool for an available token; when a token is available, leasing, by the token manager, the available token and unlocking, by the token manager, the token pool; designating by the token manager, the system as an active system and altering an owner of the token to the active system; updating by the token manager of the active system, a leasing time of the token leased during use of the token by the active system; and in response to an active system deactivation or stoppage, locking by the token manager, the token pool to return the token to the token pool and unlocking the token pool.

According to another embodiment of the present invention, a computer system for managing an active-passive topology in a distributed computing environment is disclosed. The distributed computing environment comprising a plurality of systems each having a token manager connected to a common resource accessible by all of the systems comprising a token pool of tokens, a computer comprising at least one processor, one or more memories, one or more computer readable storage media having program instructions executable by the computer to perform the program instructions. The program instructions executable by the computer of the token manager to perform a method comprising: locking, by the token manager of the system, the token pool and checking the token pool for an available token; when a token is available, leasing, by the token manager, the available token and unlocking, by the token manager, the token pool; designating by the token manager, the system as an active system and altering an owner of the token to the active system; updating by the token manager of the active system, a leasing time of the token leased during use of the token by the active system; and in response to an active system deactivation or stoppage, locking by the token manager, the token pool to return the token to the token pool and unlocking the token pool.

DETAILED DESCRIPTION

It is recognized that the token-based methodology of an embodiment of the present invention is lightweight compared to the traditional approach discussed above. The token-based methodology of the present invention leverages a decentralized mechanism, instead of a centralized system, with a HA Manager. The token-based methodology of the present invention reduces the effort required for implantation and maintenance. Without the dedicated system of the HA manager, the system deployment and maintenance of the present invention is less costly.

It will also be recognized that the token-based methodology of the present invention also avoids Network Quorum related issues, such as Split-brain. By managing a Token Pool inside a Common Resource, the present invention delegates Common Resources to manage Network Quorum related issues, such that the methodology of the present invention is much lighter and reliable.

Figure 1:
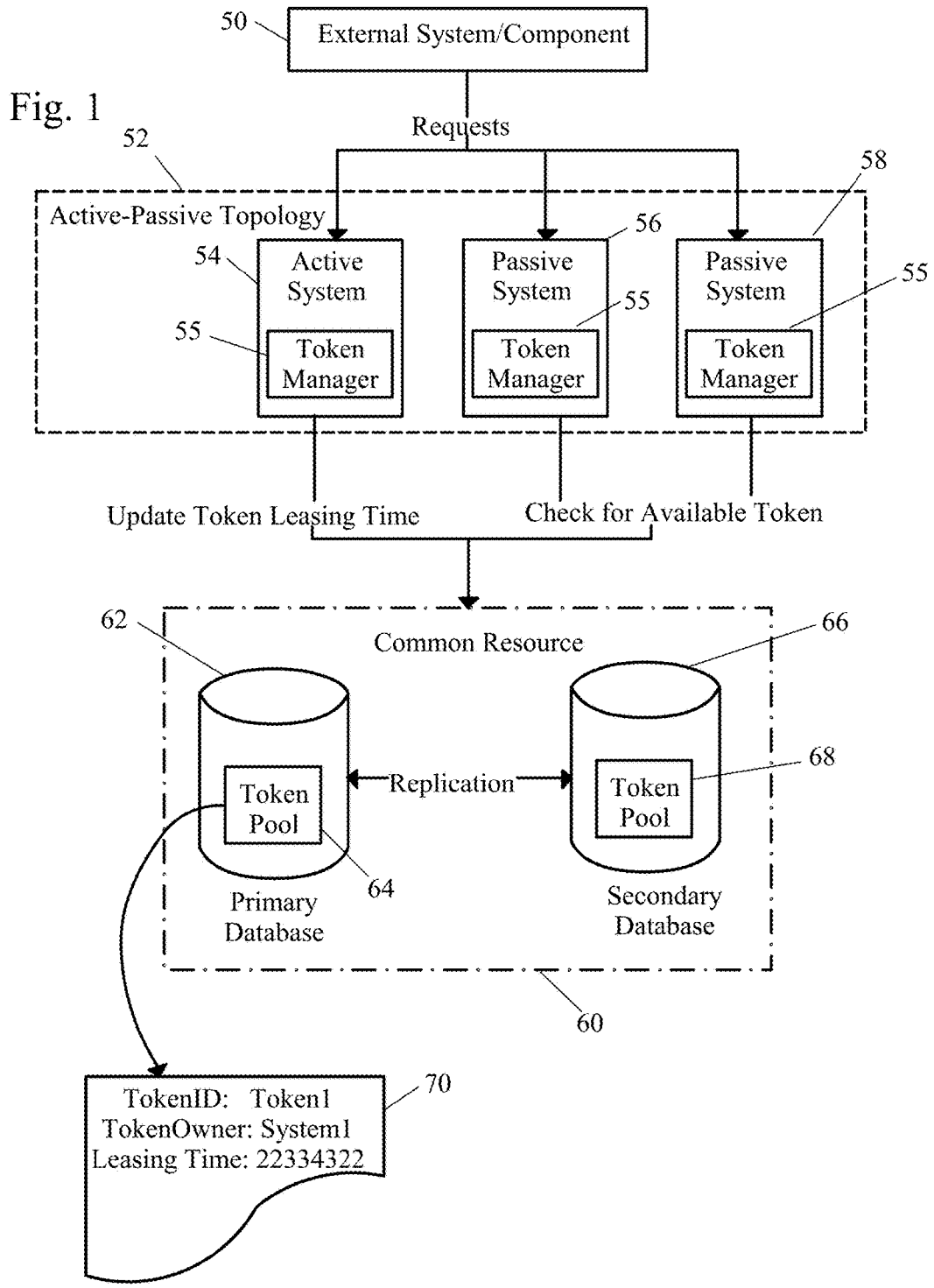
FIG. 1 shows a token-based active-passive system topology architecture diagram according to an embodiment of the present invention.

FIG. 1 shows a token-based active-passive system topology architecture diagram according to an embodiment of the present invention.

An external system or component 50 is connected to an active-passive topology 52. The active-passive topology 52 has at least one active system 54 and at least two passive systems 56, 58. The active system 54 will process the incoming requests while the passive systems 56, 58 ignore the requests. While one active system and two passive systems are shown, additional active and passive systems may be present. Each system of the topology has a Token Manager 55. Each system 56, 58 of the topology 52 is connected to a common resource 60. The common resource 60 has a token pool 64, which is accessible by all systems in the topology. In one embodiment, a network database 62 may be used to store the token pool 64. A secondary database 66 has a token pool 68 as well and may be used to provide redundancy and failover.

Figure 5:
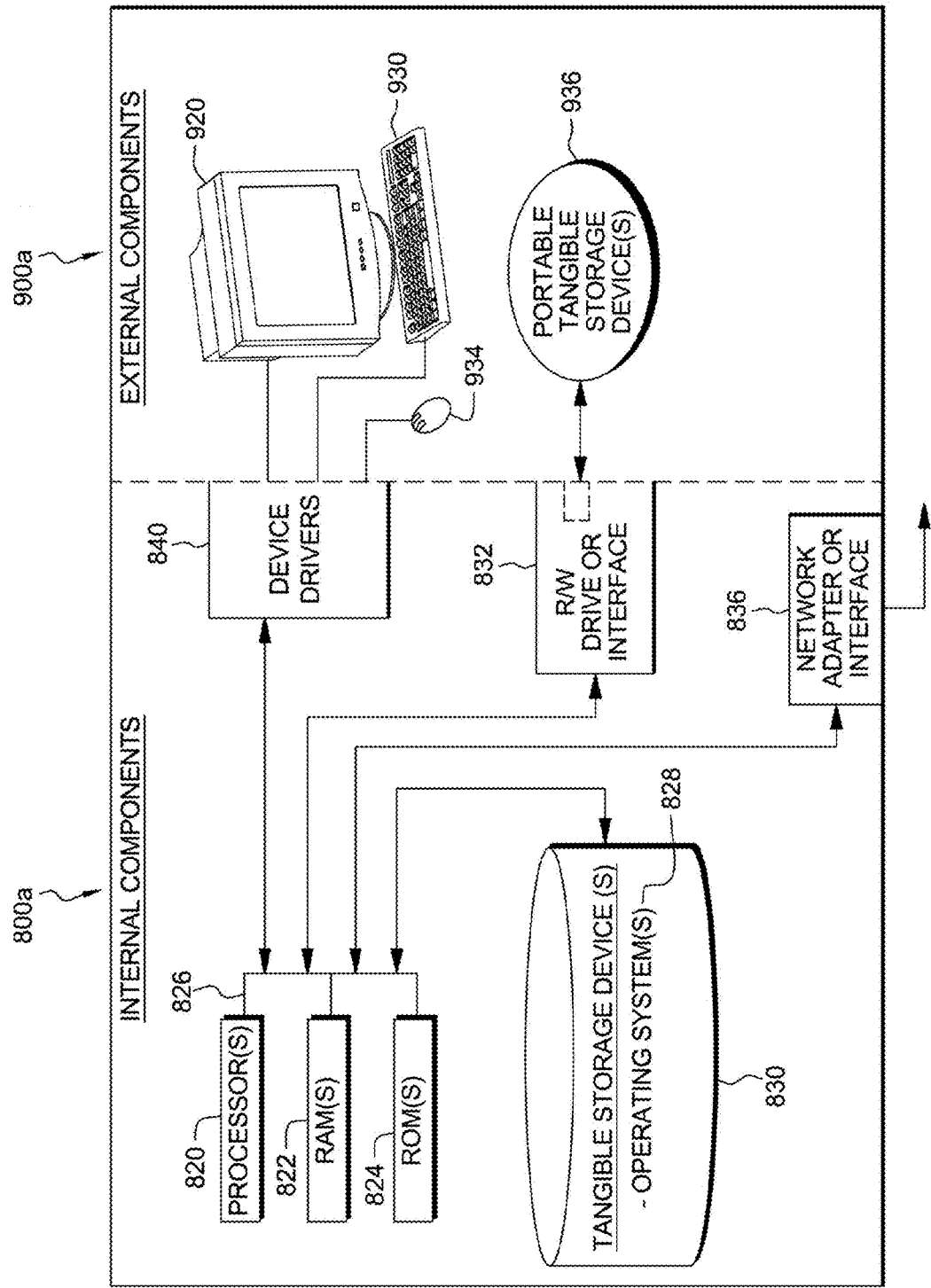
FIG. 5 illustrates internal and external components of the token-based active-passive system topology architecture, the external component, and the active and passive systems of the active-passive topology in which illustrative embodiments may be implemented.

The external system or component 50, the active-passive topology 52 and the at least one active system 54 and at least two passive systems 56, 58 have internal and external components 800a, 900a as shown in FIG. 5.

The Token Manager 55 is responsible for lease and return of tokens to the token pool 64. When a system is active, the Token Manager 55 periodically updates the token's leasing time to prevent it from expiration. When the active system stops or demotes to being a passive system, the Token Manager 55 returns the token to the token pool 64.

When a system is passive, the Token Manager 55 periodically checks the token pool 64 for available tokens. When a token is available, the passive system can lease the token and become an active system.

Each token 70 in the token pool 64 has three attributes: Token ID, Token Owner, and Leasing Time. The Token ID is a unique identifier associated with each token in the pool. Owner Name is a unique identifier of the leasing system of the token. When an Owner Name is specified, the token is leased to that owner system. When Owner Name is removed, the token is available. Leasing Time is the last update timestamp from the leasing system. If the Leasing Time is not updated after a defined period of time, the token will expire and be available for lease.

FIG. 5 illustrates internal and external components of the token-based active-passive system topology architecture, the external component, and the active and passive systems of the active-passive topology.

In FIG. 5, the external system or component 50, the active-passive topology 52 and the at least one active system 54 and at least two passive systems 56, 58 include respective sets of internal components 800a and external components 900a. Each of the sets of internal components 800a includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 are stored on one or more of the computer-readable tangible storage devices 830 for execution by one or more of the processors 820 via one or more of the RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a also includes a R/W drive or interface 832 to read from and write to one or more portable computer-readable tangible storage devices 936 such as a CD-ROM, DVD, memory stick, magnetic tape, magnetic disk, optical disk or semiconductor storage device.

Each set of internal components 800a also includes a network adapter or interface 836 such as a TCP/IP adapter card. Information can be downloaded to the active-passive topology 52 and the at least one active system 54 and at least two passive systems 56, 58 from an external computer via a network (for example, the Internet, a local area network or other, wide area network) and network adapter or interface 836. From the network adapter or interface 836, information can be loaded into hard drive 830. Information can also be downloaded to the authentication management server computer 54 from an external computer via a network (for example, the Internet, a local area network or other, wide area network) and network adapter or interface 836 or to devices of network n 52 or network one 56. The network may comprise copper wires, optical fibers, wireless transmission, routers, firewalls, switches, gateway computers and/or edge servers.

External components 900a of the external system or component 50, the active-passive topology 52 and the at least one active system 54 and at least two passive systems 56, 58 can include a computer display monitor 920, a keyboard 930, and a computer mouse 934. Each of the sets of internal components 800a can include or have devices which also include device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Figure 2:
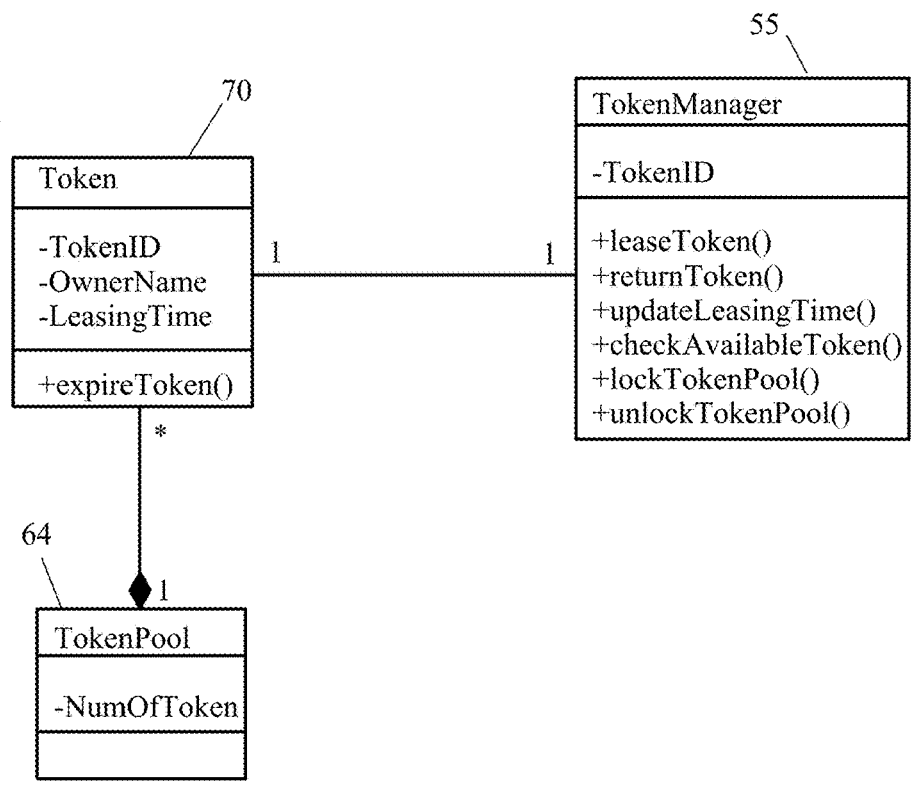
FIG. 2 shows a UML class diagram of the tokens according to an embodiment of the present invention.

FIG. 2 shows a UML class diagram of the tokens according to an embodiment of the present invention.

Each token 70 includes attributes of: TokenID, OwnerName, and LeasingTime. Each token can expire after a certain time period or when a fail occurs. The token 70 has a binary association with a Token Manager 55. Each token 70 has no more than one Token Manager 55. Many tokens 70 are present in the token pool 64. The token pool 64 can keep track of the number of tokens.

The Token Manager 55 includes the attribute of token ID (TokenID) for each token 70. The Token Manager 55 can lease a token 70 from the token pool 64 (+leaseToken( )), return a token 70 to the token pool 64 (+returnToken( )), update leasing time of a token (+updatingLeasingTime( )), check availability of a token 70 in the token pool 64 (+checkAvailableToken( )), lock the token pool 64 (+lockTokenPool( )) and unlock the token pool 64 (+unlockTokenPool( )). The locking of the token pool 64 prevents any changes to the pool of tokens and their associated status, either leased or available, until the token pool is unlocked.

Figure 3:
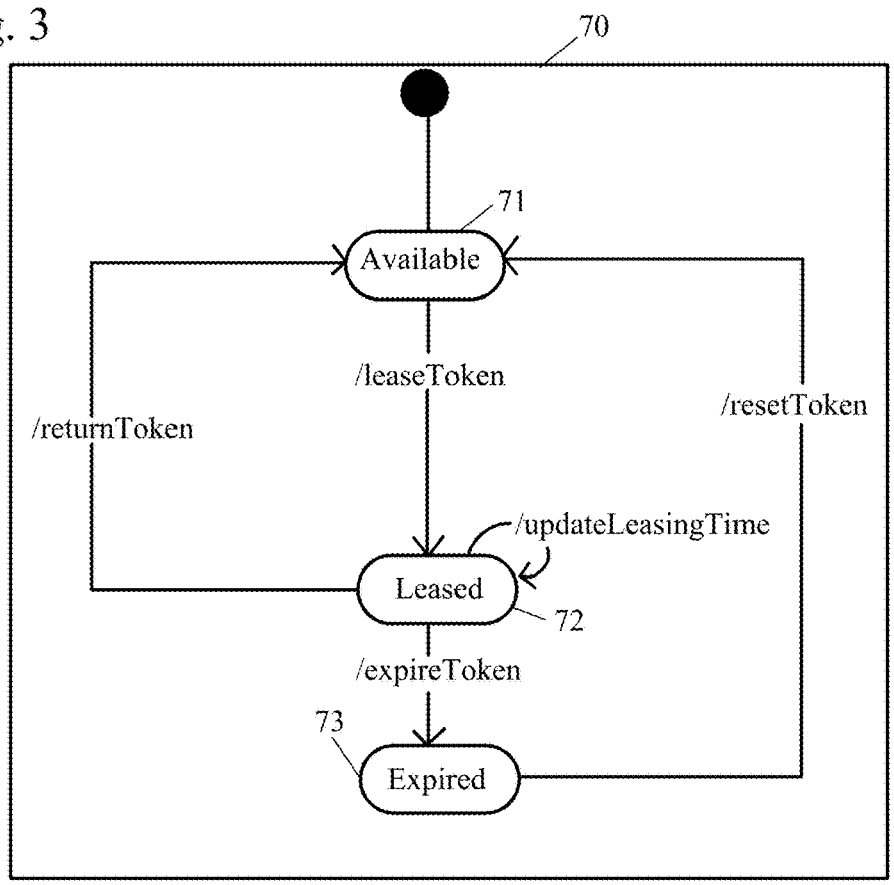
FIG. 3 shows a token state lifecycle according to an embodiment of the present invention.

FIG. 3 shows a token state lifecycle according to an embodiment of the present invention. The token state lifecycle is managed by the Token Manager 55, which controls various states of the token 70 throughout its lifecycle.

A token 70 has three states during its lifecycle, available 71, leased 72 or expired 73. In an available state 71, the token 70 is ready for use. In a leased state 72, the token 70 is currently in use by an active system and, in an expired state, the token 70 is no longer available for use by an active system and must be returned to the token pool 64. To change a token's state from available 71 to leased 72, the Token Manager 55 leases the token (/leaseToken). While the token 70 is in the leased 72 state, the lease time can be updated (/updateLeasingTime) multiple times during the use of the token 70 by the active system 54. Updating the lease time will not change the state of the token 70.

To change a token's state from available 71 to leased 72, the Token Manager 55 leases the token (/leaseToken) and the initial lease time is given. The initial lease time is predefined by the system topology 52. While the token 70 is in the leased 72 state, the lease time can be extended by updating (/updateLeasingTime) the least time via Token Manager 55. The lease time is updated to indicate that the token 70 is still in use. Updating lease time (/updateLeasingTime) will not change the state of the token 70.

When the token 70 has expired (/expireToken), the token 70 is marked as expired, altering the status of the token 70 from leased to expired. The expired token 70 is placed back in the pool of available tokens by resetting the token (/resetToken). The leased token's status can also be altered when the use of the token 70 is complete, returning the token to the token pool (/returnToken), changing the status of the token 70 from leased to available.

Figure 4:
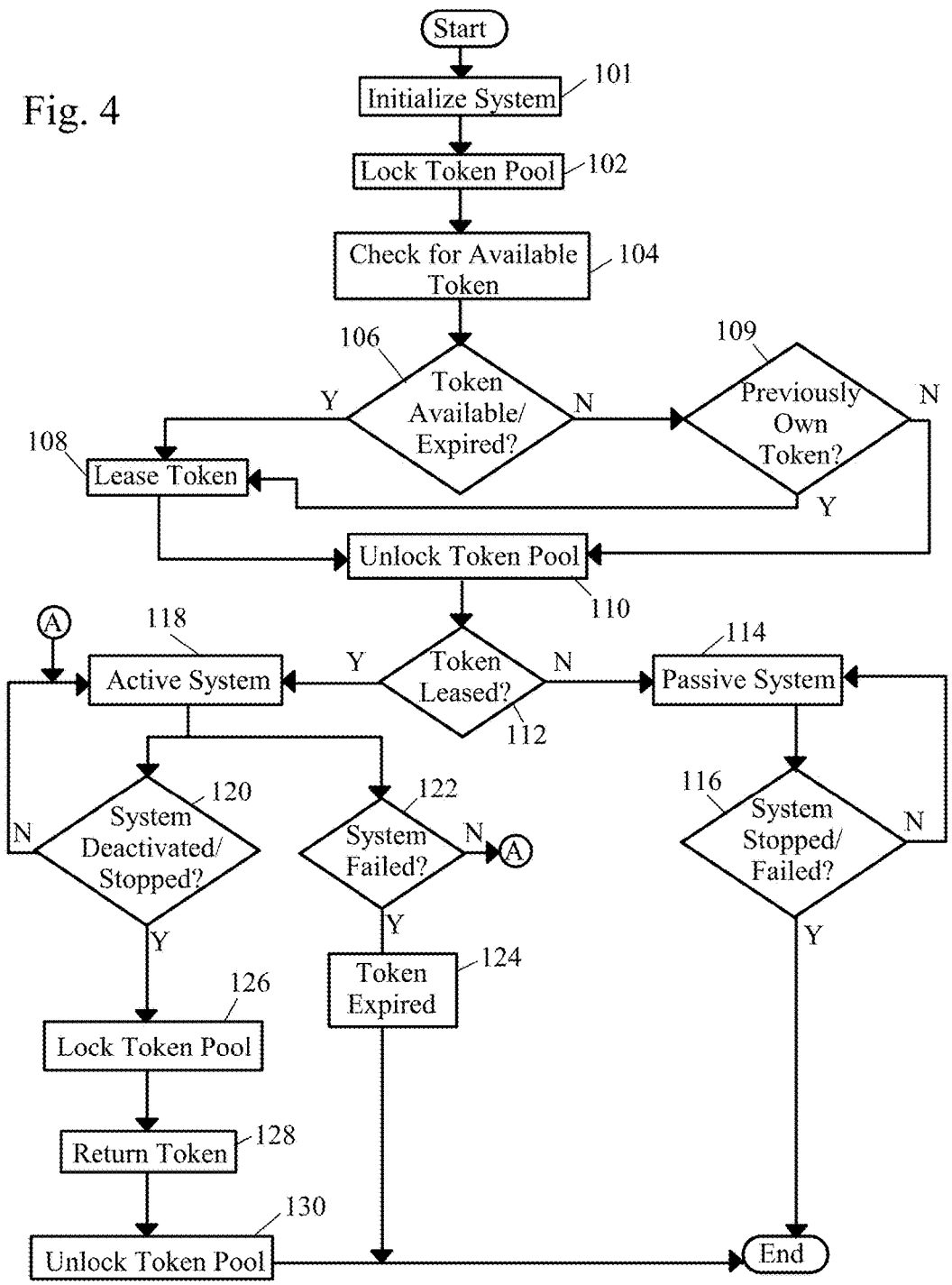
FIG. 4 shows a flow diagram of a method of managing an active-passive system topology in a distributed computing environment.

FIG. 4 shows a flow diagram of a method of managing an active-passive system topology in a distributed computing environment.

The Token Manager 55 manages the active-passive system lifecycle in the topology. When leasing or returning a token to the token pool, the Token Manager needs to lock the token pool to ensure only one system can access the token pool at any time. This is to preserve the data integrity of the token pool and avoid any data corruption and racing condition.

A token pool 64 is created and stored in a common resource 60 that is accessible by all systems 54, 56 58 in the topology 52. The common resource 60 can be a network database, network file storage or common application. The number of tokens 70 allocated in the token pool 64, 68 is equal to the number of active systems 54 required in the topology 52. The tokens 70 in the token pool 64, 68 contain at least two attributes: Owner and Leasing Time. The tokens 70 can be leased and returned to the token pool 64.

In a first step, after any system in the topology initializes (step 101), the Token Manager 55 locks the token pool 64 (step 102). The locking of the token pool 64 is such that only one system can access the token pool 64 at any one time and no more than one system is able to lease the same token 70.

The Token Manager 55 checks the token pool 64 for available tokens (step 104). If a token is available (step 106), the Token Manager leases the token (step 108) and the method continues to step 110. When a token is leased, the leasing system becomes the Owner, and the leasing time is updated. Additionally, the system which leases the system becomes active, otherwise the system is passive.

If the token is unavailable (step 106), and a previous Owner of the token is not present, the method continues to step 110.

If the token is unavailable (step 106) and a previous Owner of the token is present, the token is leased (step 108) and the method continues to step 110.

In step 110, the token pool is unlocked by the Token Manager 55.

If the token is not leased (step 112), the system is designated as a passive system (step 114). If the system has stopped or failed (step 116), the method ends.

If the system has not stopped or failed, the system remains as a passive system until the Token Manager 55 determines that a token is available from the token pool by periodically checking the token pool for available tokens by returning to step 102.

If the token is leased (step 112), the system is designated as an active system (step 118). If the system has been deactivated or stopped (step 120), the Token Manager 55 locks the token pool 64 (step 126), returns the token to the token pool (step 128), unlocks the token pool (step 130) and the method ends. When the token is returned to the token pool, the Owner and leasing time are removed and the token will become available for lease again once the token pool is unlocked.

If the system has not been deactivated or stopped (step 120), the system remains an active system until the Token Manager 55 determines that the token leasing time has expired or not by periodically updating the leasing time and the method continues to step 118. Regular updates of the token's leasing time while the system remains active prevents the token from expiring and returning to the token pool.

If the system has failed (step 122), the Token Manager 55 from the same system cannot update the token's lease time, so the token will expire (step 124) after the lease time lapses, the method ends. It should be noted that when the token is expired, the Token Manager 55 from the same system cannot return the token to the token pool while the Token Manager from another system in the topology 52 can remove the token's owner and lease time and return it to Token Pool 64. When the token has not yet expired and the same system is restarted, the Token Manager 55 will check the token pool and find the token owned by itself and the Token Manager 55 can reclaim this previously owned token and the system can be designated as active.

If the system has not failed (step 122), the system remains an active system until the Token Manager 55 determines that the token leasing time has expired or not by periodically updating the leasing time and the method continues to step 118.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing requests from an external component to an active-passive topology in a distributed computing environment comprising a plurality of systems in which at least one of the plurality of systems is a passive system and at least one of the plurality of systems is an active system, each system of the plurality of systems having a token manager connected to a common resource accessible by all of the plurality of systems comprising a token pool of tokens, the method comprising the steps of:

a token manager of the passive system of the plurality of systems locking the token pool and checking the token pool for an available token;

when a token is available, the token manager of the passive system leasing the available token and unlocking the token pool;

the token manager of the passive system designating the passive system of the plurality of systems as an active system of the plurality of systems and altering an owner of the token to the active system;

the token manager of the active system updating a leasing time of the token leased during use of the token by the active system; and in response to an active system of the plurality of systems deactivation or stoppage, the token manager of the active system locking the token pool to return the token to the token pool and unlocking the token pool and the active system being designated as a passive system of the plurality of systems.

2. The method of claim 1, wherein the common resource is selected from a group consisting of a network database, a network file storage system, and a common application.

3. The method of claim 1, wherein a number of tokens allocated in the token pool equals a number of active systems of the plurality of systems required in the active-passive system topology.

4. The method of claim 1, wherein each of the tokens in the token pool comprises attributes of at least token identification, token owner and leasing time of the token by the owner.

5. The method of claim 1, wherein, when the token pool is locked, only the active system or passive system of the plurality of systems which locked the token pool can access the tokens in the token pool.

6. The method of claim 1, wherein a token can only be used by one system of the plurality of systems at a time.

7. The method of claim 1, wherein, when a token is unavailable for lease by a system of the plurality of systems, the token manager designates the system as a passive system.

8. The method of claim 7, wherein the token manager of the passive system of the plurality of systems periodically checks the token pool by: locking the token pool and checking for an available token for use.

9. The method of claim 1, wherein, if a failure of the active system leasing a token occurs, upon restart of the active system, the token manager:
locks the token pool;
checks for available tokens designated as being owned by the active system; and
reclaims the token designated as being owned by the active system by updating the leasing time of the token.

10. The method of claim 9, wherein, prior to the restart of the active system, the token is returned to the token pool after expiration of the leasing time of the token by another token manager.

11. The method of claim 1, further comprising the steps of the token manager of the active system returning the token to the token pool and removing the owner and the leasing time from the token, such that the token is available in the token pool for lease by another system of the active-passive system topology.

12. A computer program product for managing requests from an external component to an active-passive topology in a distributed computing environment comprising a plurality of systems in which at least one of the plurality of systems is a passive system and at least one of the plurality of systems is an active system, each system of the plurality of systems having a token manager connected to a common resource accessible by all of the plurality of systems comprising a token pool of tokens, the token manager having a computer comprising at least one processor, one or more memories, one or more computer readable storage media, the computer program product comprising a computer readable storage medium having program instructions embodied therewith, the program instructions executable by the computer of the token manager to perform a method comprising:

locking, by the token manager of the passive system of the plurality of systems, the token pool and checking the token pool for an available token;

when a token is available, leasing, by the token manager of the passive system, the available token and unlocking, by the token manager, the token pool;

designating by the token manager, the passive system of the plurality of systems as an active system of the plurality of systems and altering an owner of the token to the active system;

updating by the token manager of the active system, a leasing time of the token leased during use of the token by the active system; and in response to an active system of the plurality of systems deactivation or stoppage, locking by the token manager of the active system, the token pool to return the token to the token pool and unlocking the token pool and the active system being designated as a passive system of the plurality of systems.

13. The computer program product of claim 12, wherein the common resource is selected from a group consisting of a network database, a network file storage system, and a common application.

14. The computer program product of claim 12, wherein a number of tokens allocated in the token pool equals a number of active systems of the plurality of systems required in the active-passive system topology.

15. The computer program product of claim 12, wherein each of the tokens in the token pool comprises attributes of at least token identification, token owner and leasing time of the token by the owner.

16. The computer program product of claim 12, wherein a token can only be used by one system of the plurality of systems at a time.

17. The computer program product of claim 12, wherein, when a token is unavailable for lease, designating, by the token manager, the system of the plurality of systems as a passive system.

18. The computer program product of claim 17, wherein the token manager of the passive system of the plurality of systems periodically checks the token pool by: locking the token pool and checking for an available token for use.

19. The computer program product of claim 12, wherein, if a failure of the active system leasing a token occurs, upon restart of the active system, the token manager:
locking the token pool;
checking for available tokens designated as being owned by the active system; and
reclaiming the token designated as being owned by the active system by updating the leasing time of the token.

20. A computer system for managing requests from an external component to an active-passive topology in a distributed computing environment, the distributed computing environment comprising a plurality of systems in which at least one of the plurality of systems is a passive system and at least one of the plurality of systems is an active system, each system of the plurality of systems having a token manager connected to a common resource accessible by all of the plurality of systems comprising a token pool of tokens, a computer comprising at least one processor, one or more memories, one or more computer readable storage media having program instructions executable by the computer to perform the program instructions comprising program instructions executable by the computer of the token manager to perform a method comprising:
- locking, by the token manager of the passive system of the plurality of systems, the token pool and checking the token pool for an available token;
- when a token is available, leasing, by the token manager of the passive system, the available token and unlocking, by the token manager, the token pool;
- designating by the token manager, the passive system of the plurality of systems as an active system of the plurality of systems and altering an owner of the token to the active system;
- updating by the token manager of the active system, a leasing time of the token leased during use of the token by the active system; and
- in response to an active system of the plurality of systems deactivation or stoppage, locking by the token manager of the active system, the token pool to return the token to the token pool and unlocking the token pool and the active system being designated as a passive system of the plurality of systems.

\* \* \* \* \*